United States Patent
Ho

(10) Patent No.: US 6,481,667 B1
(45) Date of Patent: Nov. 19, 2002

(54) SYSTEM AND METHOD FOR DEFLECTING AN AERODYNAMIC CONTROL SURFACE

(75) Inventor: Yu-Hang Ho, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/800,170

(22) Filed: Mar. 5, 2001

(51) Int. Cl.⁷ .................................................. B64C 9/08
(52) U.S. Cl. ..................................... 244/75 R; 244/213
(58) Field of Search ................................. 244/216, 213, 244/215, 219, 214, 75 R

(56) References Cited

U.S. PATENT DOCUMENTS

| | | | |
|---|---|---|---|
| 2,404,045 A | 7/1946 | Flader | 244/42 |
| 2,899,152 A | 8/1959 | Weiland | 244/85 |
| 3,051,137 A | 8/1962 | Kutzler | 121/38 |
| 4,247,066 A | 1/1981 | Frost et al. | 244/219 |
| 4,793,571 A | 12/1988 | Kranz | 244/3.1 |
| 5,094,412 A | 3/1992 | Narramore | 244/214 |
| 5,538,202 A * | 7/1996 | Thornburg | 244/215 |
| 5,626,312 A | 5/1997 | Head | 244/75 |
| 5,651,513 A | 7/1997 | Arena | 244/75 |
| 5,655,737 A | 8/1997 | Williams et al. | 244/212 |
| 6,010,098 A * | 1/2000 | Campanile et al. | 244/219 |
| 6,070,834 A * | 6/2000 | Janker et al. | 244/213 |
| 6,231,013 B1 * | 5/2001 | Jaenker | 244/215 |
| 6,257,528 B1 * | 7/2001 | Brislawn | 244/211 |
| 6,276,641 B1 * | 8/2001 | Gruenewald et al. | 244/213 |
| 6,354,536 B1 * | 3/2002 | Torok et al. | 244/39 |
| 2001/0035477 A1 * | 11/2001 | Fink et al. | 244/215 |

* cited by examiner

Primary Examiner—Peter M. Poon
Assistant Examiner—Timothy D. Collins
(74) Attorney, Agent, or Firm—Baker Botts L.L.P.

(57) ABSTRACT

According to one embodiment of the invention, a system for deflecting an aerodynamic control surface includes a first piezoelectric actuator coupled to a first flexure member. The first flexure member has a first end coupled to a first surface of the aerodynamic control surface and is operable to amplify a linear motion of the first piezoelectric actuator. The system further includes a second piezoelectric actuator coupled to a second flexure member. The second flexure member has a first end coupled to a second surface of the aerodynamic control surface and is operable to amplify a linear motion of the second piezoelectric actuator.

22 Claims, 4 Drawing Sheets

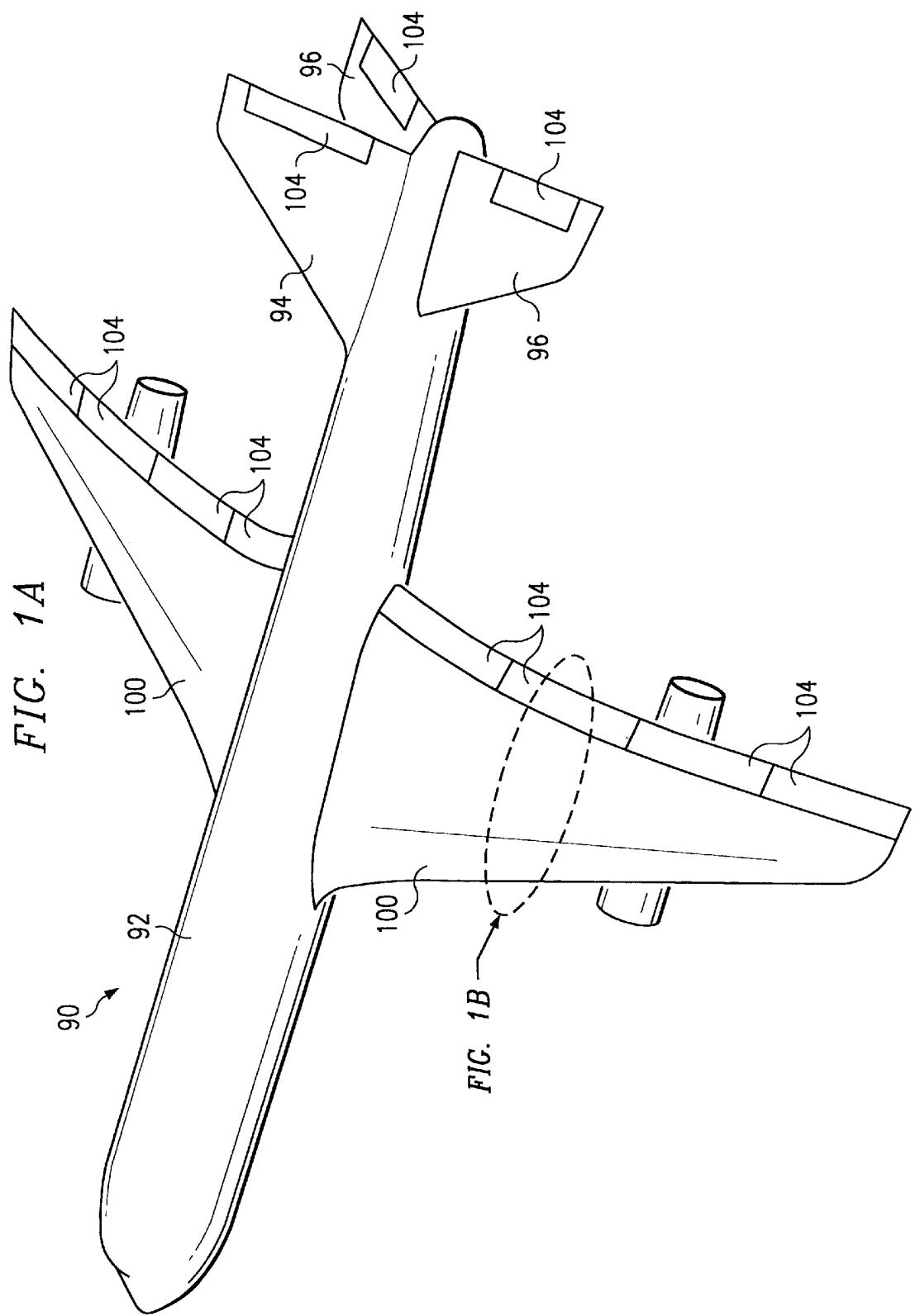

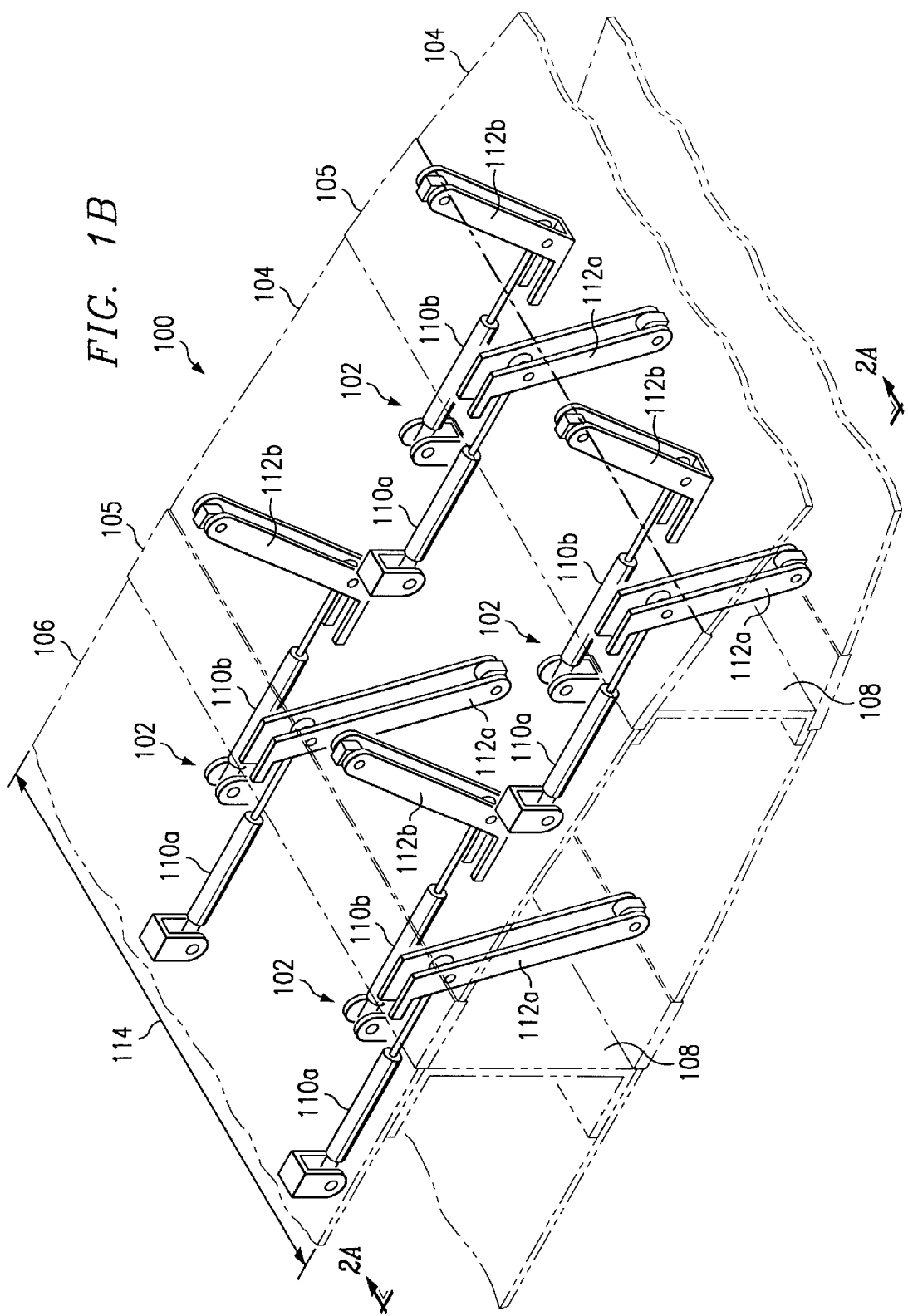

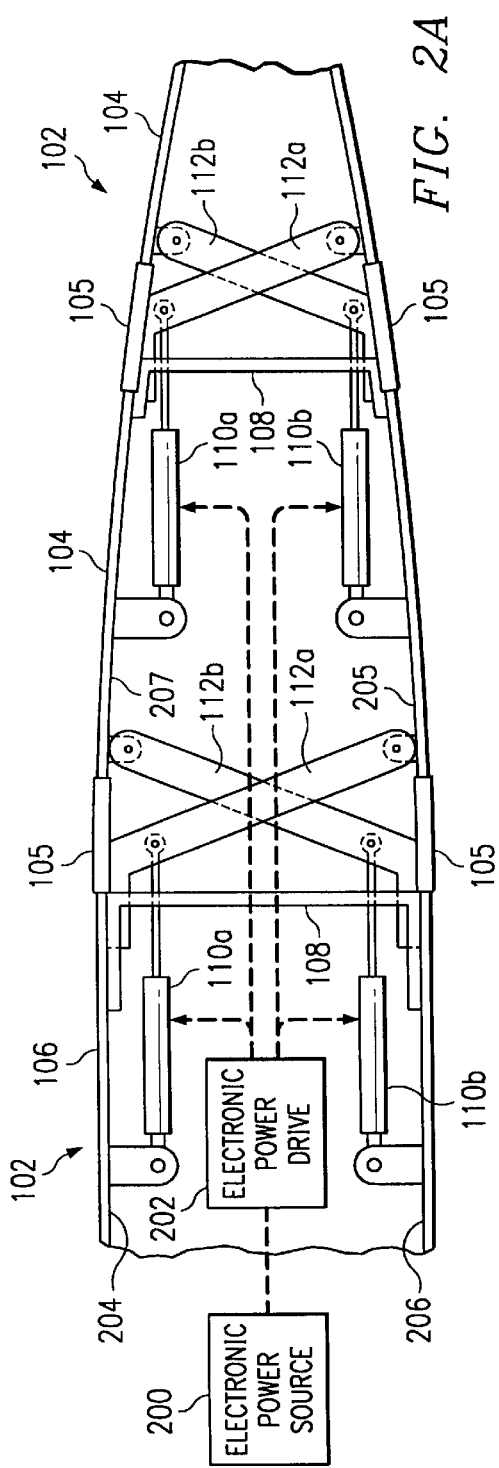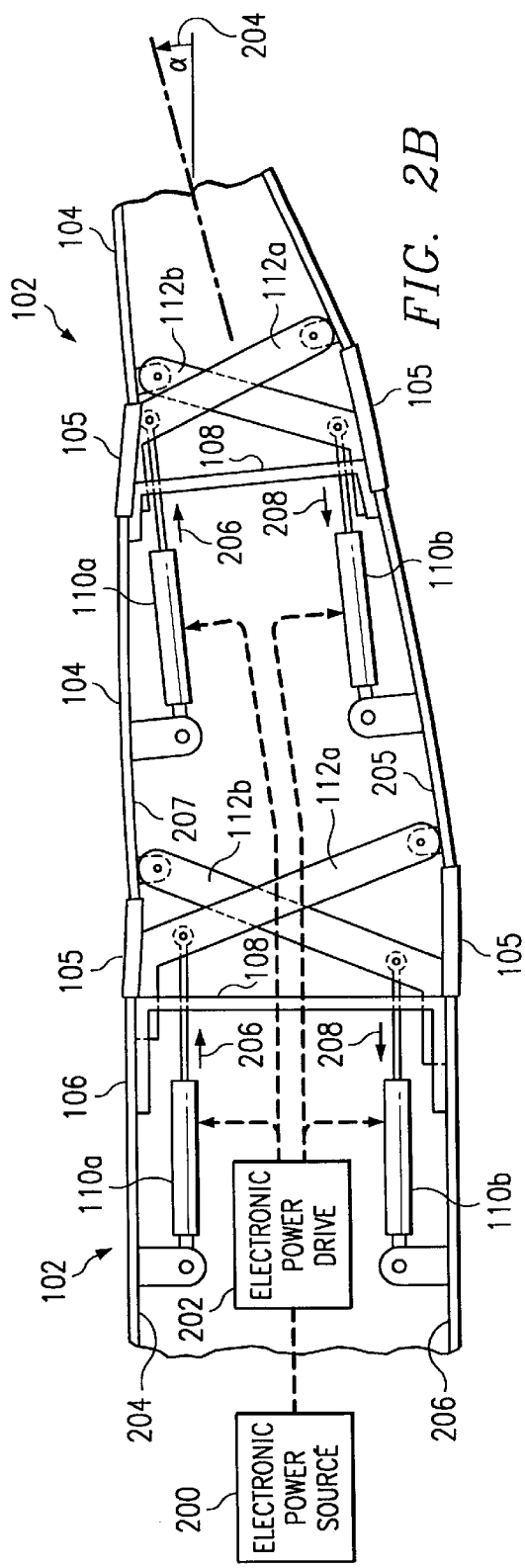

SYSTEM AND METHOD FOR DEFLECTING AN AERODYNAMIC CONTROL SURFACE

TECHNICAL FIELD OF THE INVENTION

This invention relates generally to the field of aerostructures and, more specifically, to a system and method for deflecting an aerodynamic control surface.

BACKGROUND OF THE INVENTION

Control surfaces, such as flaps, ailerons, and elevators, control the direction of, and provide stability for, aeronautic vehicles, such as aircrafts. Control surfaces accomplish this control by being driven by various actuation systems. Manufacturers of control surfaces and their corresponding actuation systems desire simple designs for safety reasons and for saving space inside a wing. In addition, control surface manufacturers design and construct control surfaces to handle high aerodynamic loads and to respond quickly to pilot inputs. Some aerodynamic applications require that control surfaces accomplish large deflections quickly and smoothly to increase aerodynamic efficiency.

Some previous actuation systems, such as hydraulic, pneumatic, electro-mechanical, and electro-hydraulic systems, require many components to construct a single actuator. In addition, some of these previous systems require a high-force actuator with a long stroke. The complexity and operation of these previous systems prevent the usage of multiple actuation systems for added redundancy and improved safety. Additionally, the complexity of these previous systems wastes considerable space that can reduce fuel storage area. Additional problems with these previous systems, among others, is that they have relatively slow response times and are unable to facilitate the use of multiple control surfaces in a smooth, economical, and efficient manner.

SUMMARY OF THE INVENTION

The challenges in the field of aerostructures continue to increase with demands for more and better techniques having greater flexibility and adaptability. Therefore, a need has arisen for a new system and method for deflecting an aerodynamic control surface.

In accordance with the present invention, a system and method for deflecting an aerodynamic control surface is provided that addresses disadvantages and problems associated with previously developed systems and methods.

According to one embodiment of the invention, a system for deflecting an aerodynamic control surface includes a first piezoelectric actuator coupled to a first flexure member. The first flexure member has a first end coupled to a first surface of the aerodynamic control surface and is operable to amplify a linear motion of the first piezoelectric actuator. The system further includes a second piezoelectric actuator coupled to a second flexure member. The second flexure member has a first end coupled to a second surface of the aerodynamic control surface and is operable to amplify a linear motion of the second piezoelectric actuator.

According to another embodiment of the invention, a method for deflecting an aerodynamic control surface includes rotatably coupling a first end of a first flexure member to a first surface of the aerodynamic control surface, rotatably coupling a first end of a second flexure member to a second surface of the aerodynamic control surface, rotatably coupling a first piezoelectric actuator to the first flexure member, rotatably coupling a second piezoelectric actuator to the second flexure member, electrically coupling an electronic power source to the first and second piezoelectric actuators, and inputting a first electrical charge into the first piezoelectric actuator and a second electrical charge into the second piezoelectric actuator. The first and second flexure members, in conjunction with one another, translate a first linear motion of the first piezoelectric actuator and a second linear motion of the second piezoelectric actuator into a rotational motion of the aerodynamic control surface.

Embodiments of the invention provide numerous technical advantages. For example, a technical advantage of one embodiment of the present invention is that a small piezoelectric actuator stroke produced at a high rate and force allows useful control surface deflections. Another technical advantage of one embodiment of the present invention is that the simplicity of a piezoelectric actuation system allows multiple control surface usage for enhanced safety and larger control surface deflections. In addition, the use of multiple control surfaces results in smooth control surface deflections that have maximum aerodynamic efficiency.

Other technical advantages are readily apparent to one skilled in the art from the following figures, descriptions, and claims.

BRIEF DESCRIPTION OF THE DRAWINGS

For a more complete understanding of the invention, and for farther features and advantages, reference is now made to the following description, taken in conjunction with the accompanying drawings, in which:

FIG. 1A is a perspective view of an aircraft having multiple aerodynamic control surfaces according to one embodiment of the present invention;

FIG. 1B is a perspective view illustrating a portion of a wing of the aircraft in FIG. 1A employing a plurality of piezoelectric actuation systems for deflecting multiple aerodynamic control surfaces according to one embodiment of the present invention;

FIG. 2A is an elevation view of the portion of the aircraft wing in FIG. 1 illustrating the aircraft wing in an undeflected position and showing details of a piezoelectric actuation system of FIG. 1 with greater clarity;

FIG. 2B is an elevation view of the portion of the aircraft wing in FIG. 1 illustrating the aircraft wing in a deflected position.

DETAILED DESCRIPTION OF EXAMPLE EMBODIMENTS OF THE INVENTION

Figure 3:
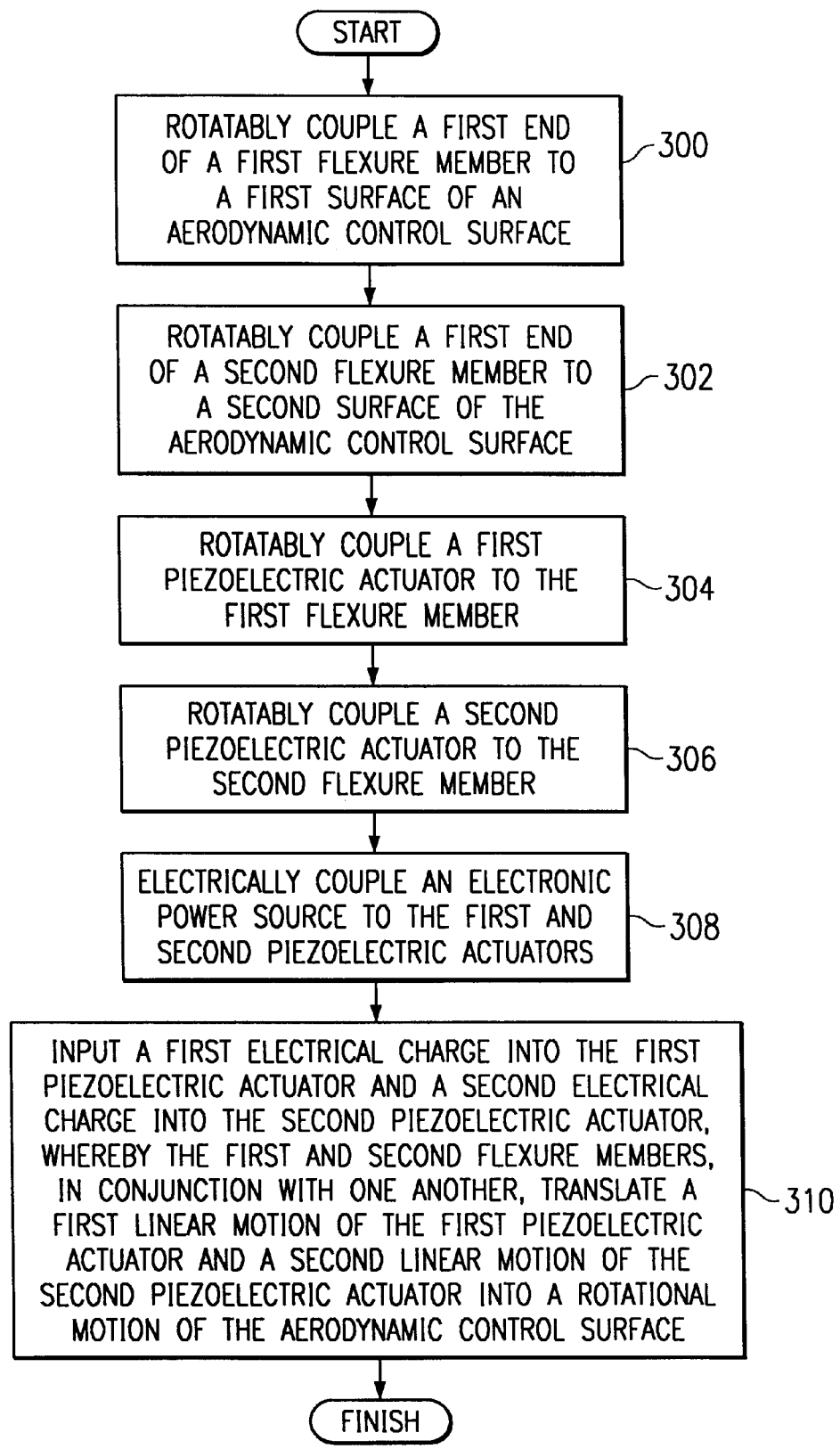
FIG. 3 is a flowchart illustrating one method for deflecting an aerodynamic control surface according to one embodiment of the present invention.

Example embodiments of the present invention and their advantages are best understood by referring now to FIGS. 1A through 3 of the drawings, in which like numerals refer to like parts.

FIG. 1A is a perspective view of an aircraft 90 having multiple aerodynamic control surfaces 104 according to one embodiment of the present invention. Control surfaces 104, such as flaps, ailerons, rudders, and elevators, control the direction of, and provide stability for, aeronautic vehicles, such as aircraft 90. Control surfaces 104 accomplish this control by being driven by actuation systems, such as the system shown in FIG. 1B.

FIG. 1B is a perspective view illustrating a portion of an aircraft wing 100 of aircraft 90 employing a plurality of piezoelectric actuation systems 102 for deflecting respective aerodynamic control surfaces 104 according to one embodiment of the present invention. Aircraft wing 100, which in other embodiments may be a tail fin 94 or tail plane 96 of aircraft 90, includes one or more control surfaces 104 and one or more main segments 106. Aircraft wing 100 may also include one or more flexible material skins 105, one or more spars 108, and various ribs and stiffeners (not explicitly shown).

In one embodiment, control surfaces 104 are flaps; however, control surfaces 104 may be other suitable types of control surfaces, such as ailerons, rudders, and elevators. Control surfaces 104 function to control the direction and stability of aircrafts, such as aircraft 90. In this embodiment, control surfaces 104 couple to main segment 106, which may attach to, or be integral with, a body 92 of aircraft 90.

Flexible material skins 105 allow control surfaces 104 to deflect in a smooth and rapid manner so that an aircraft remains stable and vibration-free during flight. Flexible material skins 105 are typically made of a flexible material, such as rubber, polymer, or composite material. Flexible material skins 105 are mechanically attached to control surfaces 104 and/or main segments 106 of aircraft wing 100.

Spars 108, which typically run a length 114 of aircraft wing 100, provide strength to aircraft wing 100. Since spars 108 are normally main members of aircraft wing 100, they are made of a suitable material, such as aluminum. However, spars 108 may be made of other high-strength, low-weight materials, such as other metals or composite materials.

According to the teachings of the present invention, one or more piezoelectric actuation systems 102 are used to control the deflection of control surfaces 104. Piezoelectric actuation system 102, which is described in greater below in conjunction with FIGS. 2A and 2B, includes a pair of piezoelectric actuators 110a, 110b and a corresponding pair of flexure members 112a, 112b. Piezoelectric actuators 110a, 110b and flexure members 112a, 112b work in conjunction with one another to translate a linear motion of piezoelectric actuators 110a, 110b into a rotational motion of control surfaces 104, as described in greater detail below.

One or any number of piezoelectric actuation systems 102 are employed depending on the size of aircraft wing 100 and the number of control surfaces 104 existing on aircraft wing 100. For example, as shown in FIG. 1, two control surfaces 104 exist on aircraft wing 100. Therefore, there are at least two piezoelectric actuation systems 102 present—one for each control surface 104. In the embodiment shown in FIG. 1, four sets of piezoelectric actuation systems 102 are present because length 114 of aircraft wing 100 utilizes multiple piezoelectric actuation systems 102 for each control surface 104 for structural and stability purposes. The distance between each piezoelectric actuation system 102 for each control surface 104 varies depending on the design parameters for a particular aircraft wing 100. In one particular embodiment, piezoelectric actuation systems 102 are spaced at a distance of approximately twenty inches; however, other suitable distances may be used. For more details of piezoelectric actuation system 102 reference is now made to FIGS. 2A and 2B.

FIGS. 2A and 2B are elevation views of a portion of aircraft wing 100 shown in FIG. 1, illustrating aircraft wing 100. in undeflected and deflected positions, respectively, and showing additional details of piezoelectric actuation system 102. FIGS. 2A and 2B are two-dimensional views illustrating one embodiment of the present invention. FIG. 2A shows two piezoelectric actuation systems 102 utilized with two control surfaces 104.

Piezoelectric actuation system 102 includes first piezoelectric actuator 110a, second piezoelectric actuator 110b, first flexure member 112a, and second flexure member 112b. Piezoelectric actuation system 102 further includes an electronic power source 200 and an electronic power drive 202. As shown in FIG. 2A, first piezoelectric actuator 110a is coupled to a first surface 204 of main segment 106 at one end and coupled to first flexure member 112a at another end. Similarly, second piezoelectric actuator 110b is coupled to a second surface 206 of main segment 106 at one end and coupled to second flexure member 112b at another end. First flexure member 112a is coupled adjacent first surface 204 of main segment 106 at one end and coupled to a second surface 205 of control surface 104 at another end. Similarly, second flexure member 112b is coupled adjacent second surface 206 of main segment 106 at one end and coupled to a first surface 207 of control surface 104 at another end. Second flexure member 112b is adjacent first flexure member 112a as seen most clearly in the perspective view of FIG. 1. In one embodiment, first flexure member 112a and second flexure member 112b are spaced at a distance of approximately three inches; however, first flexure member 112a and second flexure member 112b may be spaced at any suitable distance.

In one embodiment, first flexure member 112a and second flexure member 112b take the form of a cross-linkage as illustrated in FIG. 2A; however, other configurations may be used that are suitable for translating a linear motion of piezoelectric actuators 110a, 110b into a rotational motion of control surfaces 104. As described below in conjunction with FIG. 2B, any suitable configuration for translating and amplifying a linear displacement of piezoelectric actuators 110a, 110b into a more substantial rotational motion of control surfaces 104 may be used. In other words, flexure members 112a, 112b act as levers to amplify the relatively short stroke of piezoelectric actuators 110a, 110b.

Piezoelectric actuators are translation elements that linearly expand or contract in response to an electrical charge, such as a voltage. They are sometimes referred to as "smart materials." In one embodiment, piezoelectric actuators 110a, 110b are P-845 stacked-type piezoelectric translators manufactured by Polytec PI, Inc.; however, other suitable types of piezoelectric actuators may be used. Piezoelectric actuators 110a, 110b provide good linearity, stability, and accuracy. In addition, piezoelectric actuators 110a, 110b provide very fast response time, high stiffness, zero backlash, very little wear and tear, and typically come in small configurations, which saves space inside aircraft wing 100. The small configuration of piezoelectric actuators 110a, 110b result in one technical advantage of the present invention, in that more space can be utilized for items such as fuel.

As described above, an end of piezoelectric actuators 110a, 110b is coupled to surfaces 204, 206 of main segment 106. This may be accomplished in any suitable manner, such as in a rotatable manner, as long as the coupling arrangement can handle the loads that are expected to be encountered during flight of aircraft 90. Similarly, the other ends of piezoelectric actuators 110a, 110b are coupled to flexure members 112a, 112b in any suitable manner. In one embodiment, flexure members 112a, 112b rotate about a hinged connection in response to a linear expansion or contraction of piezoelectric actuators 110a, 110b. In addition, these ends of piezoelectric actuators 110a, 110b may be coupled to flexure members 112a, 112b in any suitable location.

As mentioned previously, piezoelectric actuators 110a, 110b linearly expand or contract based on an applied electrical charge, such as a voltage. The expansion or contraction enables a somewhat small actuator stroke. For example, a stroke of approximately a tenth of an inch may result from applied voltages to piezoelectric actuators 110a, 110b. This means that to produce useful surface deflection of control surfaces 104, an amplification system may need to be utilized. Flexure members 112a, 112b may accomplish this amplification as described below in conjunction with FIG. 2B.

Flexure members 112a, 112b, in one embodiment, are structural members having a rectangular cross-section formed from a metal, such as aluminum; however, flexure members 112a, 112b may be formed in other configurations and may be formed from other suitable types of materials, such as other metals, composites, or plastics. As mentioned previously, one end of flexure members 112a, 112b are coupled adjacent surface 204, 206 of main segment 106. This coupling may be accomplished in any suitable manner. For example, flexure members 112a, 112b may be mechanically attached to either surfaces 204, 206 of main segment 106 or they may be coupled to spar 108 of aircraft wing 100 using any suitable attachment means. In one embodiment, one end of flexure members 112a, 112b fit inside notches in spar 108 and are attached in any suitable mechanical or adhesive manner. The other ends of flexure members 112a, 112b are coupled to surfaces 205, 207 of control surface 104. This connection may be accomplished in any suitable manner. For example, a clevis-type arrangement may be utilized such that a rotatable connection exists.

Electronic power source 200 may be any suitable electronic power source that provides the required electrical charge to piezoelectric actuators 110a, 110b. Similarly, electronic power drive 202 may be any suitable electronic power drive used with piezoelectric actuators 110a, 110b to regulate the electrical charge applied to piezoelectric actuators 110a, 110b to ensure that any deflection of control surfaces 104 are accurately stabilized.

FIG. 2A illustrates multiple control surfaces 104 being controlled by a pair of piezoelectric actuation systems 102. One or any number of control surfaces 104 may be utilized according to the teachings of the present invention. Because the small size of the elements involved in the present invention, a number of control surfaces 104 may be feasible. This results in a technical advantage of the present invention in that a smooth control surface deflection having maximum aerodynamic efficiency is achieved. In addition, the simplicity of piezoelectric actuation systems 102 allow multiple piezoelectric actuation systems 102, which enhance safety. Piezoelectric actuation systems 102 translate linear motion of piezoelectric actuators 110a, 110b into a useful rotational motion of one or more control surfaces 104 as described further below in conjunction with FIG. 2B.

FIG. 2B shows aircraft wing 100 in a deflected position according to one embodiment of the present invention. The following discussion of FIG. 2B describes how piezoelectric actuation systems 102 work. As illustrated by arrow 206, piezoelectric actuator 110a expands as a result of a first applied electrical charge from electronic power source 200, thereby pushing flexure member 112a outward. At the same time, piezoelectric actuator 110b contracts as a result of a second applied electrical charge from electronic power source 200, as illustrated by arrow 208, thereby pulling in second flexure member 112b. The combined action of piezoelectric actuators 110a and 110b cause control surface 104 to rotate upward. Depending on the length of flexure members 112a and 112b, and where piezoelectric actuators 110a and 110b couple to flexure members 112a, 112b, the amplification of the relatively small displacement of piezoelectric actuators 110a, 110b is amplified to produce useful deflection of control surface 104. The same goes for piezoelectric actuation system 102, which deflects control surface 104 in the same manner as described above. A deflection 204 of control surface 104, denoted by alpha, can be in the range of +/−30°. Because of the fast response time of piezoelectric actuators 110a, 110b, deflection 204 is accomplished very quickly, which aids in the controlling of aircraft 90.

Conversely, arrows 206 and 208 may be reversed such that piezoelectric actuators 110a contracts and pulls flexure member 112a inward and piezoelectric actuator 110b expands and pushes flexure member 112b outward. This results in a deflection of control surface 104 in a downward rotational motion.

FIG. 3 is a flowchart illustrating one method for deflecting an aerodynamic control surface 104 according to one embodiment of the present invention. One end of first flexure member 112a is rotatably coupled to first surface 205 of control surface 104 at step 300. One end of second flexure member 112b is rotatably coupled to second surface 207 of control surface 104a at step 302. First piezoelectric actuator 110a is rotatably coupled to first flexure member 112a at step 304, and second piezoelectric actuator 112b is rotatably coupled to second flexure member 112b at step 306. Electronic power source 200 and electronic power drive 202 are electrically coupled to piezoelectric actuators 110a, 110b at step 308. A first electrical charge is input into first piezoelectric actuator 110a and a second electrical charge is input into second piezoelectric actuator 110b at step 310, which causes piezoelectric actuators 110a, 110b to linearly expand or contract. Thereafter, first and second flexure members 112a, 112b, in conjunction with one another, translate linear motion of first and second piezoelectric actuators 110a, 110b into a rotational motion of control surface 104. This completes one embodiment of deflecting an aerodynamic control surface 104 according to one embodiment of the present invention.

Although embodiments of the invention and their advantages are described in detail, a person skilled in the art could make various alternations, additions, and omissions without departing from the spirit and scope of the present invention as defined by the appended claims. For example, piezoelectric actuation systems 102 can be used in contexts other than aircrafts, such as aerospace vehicles and aquatic vehicles.

What is claimed is:

1. A system for deflecting an aerodynamic control surface, comprising:

a main segment having first and second surfaces disposed inwardly from the aerodynamic control surface;

a spar disposed between the first and second surfaces of the main segment;

a first piezoelectric actuator coupled at a first end to a first flexure member and rotatably coupled to the main segment at a second end, the first flexure member having a first end coupled to the first surface of the main segment and a second end coupled to the spar, the first flexure member operable to amplify a linear motion of the first piezoelectric actuator; and a second piezoelectric actuator coupled at a first end to a second flexure member and rotatably coupled to the main segment at a second end, the second flexure member having a first end coupled to the second surface of the main segment and a second end coupled to the spar, the second flexure member operable to amplify a linear motion of the second piezoelectric actuator.

2. The system of claim 1, wherein the aerodynamic control surface is a component of an aircraft wing.

3. The system of claim 1, further comprising an electronic power source operatively coupled to the first and second piezoelectric actuators and operable to input a first electrical charge into the first piezoelectric actuator and a second electrical charge into the second piezoelectric actuator.

4. The system of claim 3, wherein the first and second flexure members, in conjunction with one another, are operable to translate a linear motion of the first and second piezoelectric actuators into a rotational motion of the aerodynamic control surface based on the first electric charge applied to the first piezoelectric actuator and the second electric charge applied to the second piezoelectric actuator.

5. The system of claim 3, wherein the first and second electrical charges are voltages selected from the group consisting of a positive voltage and a negative voltage.

6. The system of claim 1, wherein the first piezoelectric actuator is rotatably coupled to the first flexure member, the second piezoelectric actuator is rotatably coupled to the second flexure member, the first end of the first flexure member is rotatably coupled to the first surface of the main segment, and the first end of the second flexure member is rotatably coupled to the second surface of the main segment.

7. The system of claim 1, wherein the first and second piezoelectric actuators are stack-type piezoelectric actuators.

8. An aircraft structure, comprising:
a main segment having first and second inner surfaces and first and second outer surfaces that define a portion of an outer surface of the aircraft structure;
a control surface having first and second inner surfaces disposed outwardly from the main segment;
a first piezoelectric actuator coupled to the first inner surface of the main segment at a first end and rotatably coupled to a first flexure member at a second end, the first flexure member having a leg portion securely coupled adjacent the first inner surface of the main segment and a lever portion rotatably coupled directly to the second inner surface of the control surface; and
a second piezoelectric actuator coupled to the second inner surface of the main segment at a first end and rotatably coupled to a second flexure member at a second end, the second flexure member having a leg portion securely coupled adjacent the second inner surface of the main segment and a lever portion rotatably coupled directly to the first inner surface of the control surface, the second flexure member adjacent the first flexure member.

9. The aircraft structure of claim 8, wherein the aircraft structure is an aircraft wing.

10. The aircraft structure of claim 8, further comprising an electronic power source operatively coupled to the first and second piezoelectric actuators and operable to input a first electrical charge into the first piezoelectric actuator and a second electrical charge into the second piezoelectric actuator.

11. The aircraft structure of claim 10, wherein the first and second flexure members, in conjunction with one another, are operable to translate a linear motion of the first and second piezoelectric actuators into a rotational motion of the aerodynamic control surface based on the first electrical charge applied to the first piezoelectric actuator and the second electrical charge applied to the second piezoelectric actuator.

12. The aircraft structure of claim 11, wherein the first and second flexure members, in conjunction with one another, are operable to amplify the linear motion.

13. The aircraft structure of claim 10, wherein the first and second electrical charges are voltages selected from the group consisting of a positive voltage and a negative voltage.

14. The aircraft structure of claim 8, wherein the first and second piezoelectric actuators are stack-type piezoelectric actuators.

15. The aircraft structure of claim 8, further comprising a spar disposed between the first and second inner surfaces of the main segment, wherein the first end of the first flexure member is coupled to the spar and the first end of the second flexure member is coupled to the spar.

16. A method for deflecting an aerodynamic control surface, the method comprising:
disposing inwardly from the aerodynamic control surface a main segment having first and second surfaces;
disposing a spar between the first and second surfaces of the main segment;
rotatably coupling a first end of a first flexure member to the first surface of the main segment;
coupling a second end of the first flexure member to the spar;
rotatably coupling a first end of a second flexure member to the second surface of the main segment;
coupling a second end of the second flexure member to the spar;
rotatably coupling a first piezoelectric actuator at a first end to the first flexure member;
rotatably coupling a second end of the first piezoelectric actuator to the main segment;
rotatably coupling a second piezoelectric actuator at a first end to the second flexure member;
rotatably coupling a second end of the second piezoelectric actuator to the main segment;
electrically coupling an electronic power source to the first and second piezoelectric actuators; and
inputting a first electrical charge into the first piezoelectric actuator and a second electrical charge into the second piezoelectric actuator, whereby the first and second flexure members, in conjunction with one another, translate a first linear motion of the first piezoelectric actuator and a second linear motion of the second piezoelectric actuator into a rotational motion of the aerodynamic control surface.

17. The method of claim 16, further comprising amplifying the first and second linear motions with the first and second flexure members.

18. The method of claim 16, wherein inputting a first electrical charge into the first piezoelectric actuator and a second electrical charge into the second piezoelectric actuator comprises inputting voltages into the first piezoelectric actuator and the second piezoelectric actuator, the voltages selected from the group consisting of a positive voltage and a negative voltage.

19. An aircraft wing, comprising:
a main segment having upper and lower surfaces;
a plurality of control surfaces having upper and lower surfaces serially disposed outwardly from the main segment;

a plurality of piezoelectric actuation systems, wherein one or more piezoelectric actuation systems couple the main segment to the control surface adjacent thereto and one or more piezoelectric actuation systems couple the control surfaces to each other; and wherein each piezoelectric actuation system comprises:
first and second piezoelectric actuators coupled to first and second flexure members, wherein the first and second flexure members, in conjunction with one another, are operable to translate a linear motion of the first and second piezoelectric actuators into a rotational motion of one of the control surfaces based on a first electric charge applied to the first piezoelectric actuator and a second electric charge applied to the second piezoelectric actuator.

20. The aircraft structure of claim 19, wherein the first and second flexure members, in conjunction with one another, are operable to amplify the linear motion.

21. The aircraft wing of claim 19, further comprising a spar disposed between the upper and lower surfaces of the main segment, wherein a first end of the first flexure members is coupled to the spar and a first end of the second flexure member is coupled to the spar.

22. The aircraft wing of claim 19, wherein the first and second piezoelectric actuators are stack-type piezoelectric actuators.

* * * * *